(12) United States Patent
Dreyfuss et al.

(10) Patent No.: US 7,601,904 B2
(45) Date of Patent: Oct. 13, 2009

(54) INTERACTIVE TOOL AND APPERTAINING METHOD FOR CREATING A GRAPHICAL MUSIC DISPLAY

(76) Inventors: Richard Dreyfuss, 119 W. 72$^{nd}$ St., New York, NY (US) 10023; Roger Luke Dubois, 311 W. 9$^{th}$ St. - #3BN, New York, NY (US) 10025; John Kiehl, 336 E. 71$^{st}$ St., Apt. 4D, New York, NY (US) 10021

( * ) Notice: Subject to any disclaimer, the term of this patent is extended or adjusted under 35 U.S.C. 154(b) by 454 days.

(21) Appl. No.: 11/499,834

(22) Filed: Aug. 3, 2006

(65) Prior Publication Data

US 2008/0314228 A1    Dec. 25, 2008

Related U.S. Application Data

(60) Provisional application No. 60/705,023, filed on Aug. 3, 2005.

(51) Int. Cl.
   *G10H 1/00* (2006.01)
(52) U.S. Cl. .......................................... 84/600; 84/601
(58) Field of Classification Search ............ 84/600–602
   See application file for complete search history.

(56) References Cited

U.S. PATENT DOCUMENTS

| | | |
|---|---|---|
| 1,085,603 A | 2/1914 | Grant |
| 3,680,428 A | 8/1972 | Bruckrucker et al. |
| 3,771,409 A | 11/1973 | Rickey |
| 3,892,478 A * | 7/1975 | Lampkin ..................... 353/15 |
| 3,978,756 A | 9/1976 | Feldman |
| 4,081,829 A * | 3/1978 | Brown ......................... 381/56 |
| 4,713,658 A | 12/1987 | Swinton |
| 4,768,086 A * | 8/1988 | Paist ............................ 381/56 |
| 5,005,459 A * | 4/1991 | Adachi et al. ................. 84/453 |

(Continued)

FOREIGN PATENT DOCUMENTS

WO    WO 97/46991    12/1997

OTHER PUBLICATIONS

Bracewell, Ronald M. "The Fourier Transform and Its Applications—Third Edition." U.S.A.: The McGraw-Hill Companies, Inc., 2000, pp. xvii-20.

(Continued)

*Primary Examiner*—David S. Warren
(74) *Attorney, Agent, or Firm*—Schiff Hardin LLP

(57) ABSTRACT

The invention provides apparatus and a method for creating a visual representation of music that conveys the musical form, structure, event surface, orchestration, and sonic framework of the piece being visualized. The representation comprises visual characters/sprites that move in time according to instructions from the metadata synchronized to the actual musical recording. These characters accurately portray the rhythm, pitch, and timbre of the individual elements in the musical surface (individual lines or performers) and have a hierarchy of representation, e.g. thematic elements that are divided into sub-elements (gestures or phrases) that are further divided into individual notes. The visual representation corresponds to the structure of the music as heard, where simultaneous harmonic events are parsed into individual notes which are then tied together into a rhythmic stream of linked events. Two streams of data (the "musical" and the "sonic") are synchronized to the musical piece to drive the visualization.

65 Claims, 8 Drawing Sheets

U.S. PATENT DOCUMENTS

| | | | |
|---|---|---|---|
| 5,048,390 A | | 9/1991 | Adachi et al. |
| 5,191,319 A | * | 3/1993 | Kiltz .......................... 345/73 |
| 5,247,126 A | * | 9/1993 | Okamura et al. ........ 434/307 A |
| 5,275,082 A | * | 1/1994 | Kestner-Clifton et al. . 84/477 B |
| 5,278,347 A | * | 1/1994 | Konishi ...................... 84/613 |
| 5,286,908 A | * | 2/1994 | Jungleib ...................... 84/603 |
| 5,301,326 A | | 4/1994 | Linnett et al. |
| 5,391,828 A | * | 2/1995 | Tajima ........................ 84/601 |
| 5,453,568 A | * | 9/1995 | Tajima et al. ................. 84/609 |
| 5,508,470 A | * | 4/1996 | Tajima et al. ................. 84/609 |
| 5,557,424 A | * | 9/1996 | Panizza ........................ 386/97 |
| 5,559,299 A | * | 9/1996 | Tajima ........................ 84/610 |
| 5,621,538 A | * | 4/1997 | Gnant et al. ................... 386/65 |
| 5,646,361 A | * | 7/1997 | Morrow .................... 84/464 R |
| 5,678,571 A | | 10/1997 | Brown |
| 5,775,915 A | | 7/1998 | Quinn |
| 5,801,694 A | | 9/1998 | Gershen |
| 5,812,688 A | * | 9/1998 | Gibson ....................... 381/119 |
| 5,890,116 A | * | 3/1999 | Itoh et al. .................... 704/260 |
| 5,913,310 A | | 6/1999 | Brown |
| 5,915,972 A | | 6/1999 | Tada ...................... 434/307 A |
| 6,005,180 A | * | 12/1999 | Masuda ........................ 84/622 |
| 6,097,927 A | * | 8/2000 | LaDue ........................ 434/308 |
| 6,127,616 A | * | 10/2000 | Yu .............................. 84/483.2 |
| 6,140,565 A | * | 10/2000 | Yamauchi et al. ............. 84/600 |
| 6,177,623 B1 | * | 1/2001 | Ooseki ...................... 84/477 R |
| 6,225,545 B1 | * | 5/2001 | Suzuki et al. ............... 84/477 R |
| 6,262,730 B1 | | 7/2001 | Horvitz et al. |
| 6,310,279 B1 | * | 10/2001 | Suzuki et al. ................. 84/600 |
| 6,353,170 B1 | * | 3/2002 | Eyzaguirre et al. ............ 84/603 |
| 6,361,188 B1 | | 3/2002 | Kuts |
| 6,433,784 B1 | * | 8/2002 | Merrick et al. .............. 345/473 |
| 6,448,483 B1 | * | 9/2002 | Loo et al. .................. 84/464 R |
| 6,646,644 B1 | * | 11/2003 | Suzuki et al. ................ 345/474 |
| 6,660,921 B2 | | 12/2003 | Deverich |
| 6,660,922 B1 | * | 12/2003 | Roeder ..................... 84/477 R |
| 6,686,529 B2 | * | 2/2004 | Kim ......................... 84/464 R |
| 6,717,042 B2 | * | 4/2004 | Loo et al. .................. 84/464 R |
| 6,757,362 B1 | | 6/2004 | Cooper et al. |
| 6,898,759 B1 | * | 5/2005 | Terada et al. ................. 715/202 |
| 7,116,328 B2 | * | 10/2006 | Kawai et al. ................. 345/473 |
| 7,208,669 B2 | * | 4/2007 | Wells et al. .................... 84/601 |
| 7,212,213 B2 | * | 5/2007 | Steinberg et al. ............. 345/589 |
| 2002/0082077 A1 | | 6/2002 | Johnson et al. |
| 2002/0117046 A1 | * | 8/2002 | Loo et al. ..................... 84/636 |
| 2002/0189431 A1 | * | 12/2002 | Loo et al. ..................... 84/636 |
| 2004/0007118 A1 | | 1/2004 | Holcombe |
| 2005/0190199 A1 | * | 9/2005 | Brown et al. ................. 345/600 |
| 2006/0156906 A1 | | 7/2006 | Haeker ........................ 84/609 |
| 2008/0156172 A1 | * | 7/2008 | Tohgi et al. ................... 84/600 |
| 2008/0156174 A1 | * | 7/2008 | Tohgi et al. ................... 84/602 |
| 2008/0156178 A1 | * | 7/2008 | Georges et al. ............... 84/645 |

OTHER PUBLICATIONS

Lerdahl, Fred. "Tonal Pitch Space." New York, U.S.A.: Oxford University Press, Inc., 2001, pp. 3-35.

Lerdahl, Fred and Jackendoff, Ray, "A Generative Theory of Tonal Music." Cambridge, Massachusetts, U.S.A.: MIT Press, 1983, pp. ix-xv, 1-17, 36-43, 68-74, 250-377, 302-332.

Malinowski, Stephen. "Music Animation Machine." Kunst der Fuge by A.G. Simonetto. Mar. 2003.

Roads, Curtis. "The Computer Music Tutorial." Cambridge, Massachusetts, U.S.A.: MIT Press, 1996, pp. 493-532.

Schenker, Heinrich. "Five Graphic Music Analyses." New York, U.S.A.: Dover Publications, Inc., 1969, pp. 9-11, 13-26, 31-33.

David Zicarelli, et al., Max 4.3 Reference Manual, 2005, 714pp, Cycling '74, published at http://www.cycling74.com/twiki/bin/view/ProductDocumentation/WebHome#Max__MSP__4__5.

* cited by examiner

INTERACTIVE TOOL AND APPERTAINING METHOD FOR CREATING A GRAPHICAL MUSIC DISPLAY

CROSS REFERENCE TO RELATED APPLICATIONS

The present application claims the benefit of U.S. Provisional Application No. 60/705,023, filed Aug. 3, 2005, herein incorporated by reference.

BACKGROUND

This invention relates to an interactive tool for creating and displaying visual representations of musical works.

There are numerous ways to convey musical content in media other than by sound recordings. Sheet music, including musical scores, conveys to a performer musical qualities such as tempo, pitch, duration, volume, and articulation. For example, the tempo and mood is indicated by separating the notes into measures and stating a tempo by phrases such as adagio, andante cantabile, presto, rallendo etc.

The pitch of individual notes is indicated by their position on a staff of five lines preceded by a clef (e.g. treble, bass, alto, etc.) and a key signature. The duration of a note is indicated by whether it is hollow or solid, by dependent flags and by its font size if it is a grace note.

Volume is indicated by combining abbreviations for forte (louder) and piano (softer) and by indicating swells (crescendos) and diminuendos by elongated wedges written below the notes.

Articulation is indicated by dots for staccato, bars for legato, curved lines for slurs, and by comments. In addition there are specialized notations for each instrument such as guitar fingerings written at chord transitions, pedal instructions for keyboard instruments, etc.

Since score reading requires a long time to learn, there have been attempts to provide information in connection with scores by using visual means.

The use of colors to indicate notes is the most common: U.S. Pat. No. 1,085,603 (Grant) discloses a method of writing music using different colors to represent the different tones of a vocal scale (this reference, and all others cited in this application are herein incorporated by reference); U.S. Pat. No. 3,680,428 (Buckrucker et al.) discloses a color coded music notation wherein a series of colored disks having different shading characteristics represent different notes; U.S. Pat. No. 5,775,915 (Quinn) discloses a music notation wherein different colors are used to represent the key and also whether the note is a sharp or flat; U.S. Pat. No. 6,127,616 (Yu) discloses a method of representing musical notes using colors and shading; U.S. Pat. No. 6,660,921 (Deverich) discloses a method for teaching a stringed instrument using colored fingering numbers; U.S. patent application No. 2004/0007118 (Holcombe) discloses a method of music notation using colors to represent the notes of a scale.

In general musical scores are intended to guide a performer, but require much interpretation in order to produce the intended musical content. Although they are a remarkably successful notation scheme, musical scores require long familiarity before being able to be converted into quality musical sound. And, even sophisticated musicians would have trouble reading a piece of sheet music or a score and getting a sense of the ultimate musical experience the way one can read words on a page and get the sense, without hearing them, of what they would sound like aloud. Thus, with some notable exceptions, composers usually work on an instrument and not by writing out what one expects to hear.

With the advent of computer displays there have been several attempts to convey graphically certain aspects of music. The web page http://www.kunstderfuge.com/theory/malinowski.htm, downloaded Jul. 26, 2006, discusses a Musical Animation Machine (MAM) providing a visual display that represents a musical performance. It is intended to be a musical score for listeners rather than a musical notation to serve the needs of composers, performers, and conductors. It uses colored bars to represent the notes of a piece. The vertical placement of each bar indicates the pitch of its note. The horizontal placement indicates its timing relative to the other notes of the piece, and the length of the bar shows its duration. These bars scroll across the screen as the piece plays. When a bar reaches the center of the screen, it brightens as its corresponding note sounds. The center of the screen is always the "now" point. The notes for different instruments are alt on the same "staff", with the different instruments indicated by color. The MAM notation can be colored to highlight thematic units, instrumentation, harmony, or dynamics. Despite its use of colors and graphics, the MAM adheres closely to the standard layout of a musical score. The graphics convey little feel for the music for someone unaccustomed to interpreting standard scores.

PCT publication WO 97/46991, entitled "Method and System for Providing Visual Representation of Music" displays graphic representations of the chords, notes and lyrics of a song correlated with the time of performance to facilitate a musician's ability to learn to play it on an instrument. U.S. Pat. No. 6,717,042 entitled "Dance Visualization of Music" discloses apparatus to analyze samples of a received stream of music and determine a music type. It then displays dance movements for the stream of music in accord with the type. U.S. Pat. No. 6,686,529 entitled "Method and Apparatus for Selecting Harmonic Color Using Harmonics, and Method and Apparatus for Converting Sound to Color or Color to Sound", discloses an apparatus to convert sound into a color image by selecting a color based on the harmonics. U.S. Pat. No. 6,353,170 entitled "Method and System for Composing Electronic Music and Generating Graphical Information" discloses a system to allow a user to interactively arrange music samples that are looped to create a musical work. The user creates a video of an animated character that dances to the rhythm and beat by selection from several video clips, which may then be edited. In the same vein is U.S. Pat. No. 5,801,694.

U.S. Pat. No. 6,225,545 entitled "Musical Image Display Apparatus and Method Storage Medium Therefor" discloses a display where a drawing pattern is read from a data base corresponding to musical instruments. The drawing pattern is modified according to performance information. U.S. Pat. No. 6,140,565 entitled "Method of Visualizing Music System by Combination of Scenery Picture and Player Icons" discloses a method for displaying a scenery setting matching an environment in which the music should be played. It provides an icon corresponding to the timbre of the performance. U.S. Pat. No. 5,646,361 entitled "Laser Emitting Visual Display for a Music System" describes a visual display formed by lasers responding to the frequency and volumes of music. In the same vein is U.S. Pat. No. 6,361,188.

U.S. Pat. No. 5,286,908 entitled "Multi-Media System Including Bi-Directional Music-To-Graphic Display Interface" describes a music controlled graphic interface having a lookup table of video/graphic data and using digital musical information as an index into the table. Alternatively an algorithm can calculate video data in real time corresponding to the digital musical information. U.S. Pat. No. 5,275,082 entitled "Visual Music Conducting Device" displays a simulation of the movement of a conductor's baton in response to electronic timing signals representative of the tempo of a piece of music.

U.S. Pat. No. 5,191,319 entitled "Method and Apparatus for Visual Portrayal of Music" discloses a visual color display that portrays music. The audio signal amplitude causes the display brightness to vary. The audio signal frequency content causes the color of the display to vary. Preselected light colors are assigned to frequency bands. A display using two adjacent light sources is presented on a globe to produce attractive color blending. U.S. Pat. No. 5,048,390 entitled "Tone Visualizing Apparatus" discloses a detector for characteristics of an audio signal such as envelope, chord, spectrum components, number of zero-cross points and energy. These are turned into display parameters such as size, brightness or color so that the impression of the image is matched with that of the audio tone.

U.S. Pat. No. 5,005,459 entitled "Musical tone Visualizing Apparatus Which Displays an Image of an Animated Object in Accordance With a Musical Performance" discloses an apparatus that stores images of players or musical instruments. These are moved in response to performance of an electronic musical instrument. That image may be selectively enlarged whose tone volume is largest during the performance. U.S. Pat. No. 4,713,658 entitled "Apparatus for Providing a Visual Interpretation of an Audio Signal" describes an apparatus for analyzing a musical signal electronically into frequency or amplitude characteristics. Each characteristic controls a motor operating a rotatable indicator. The amplitude component rotates the whole indicator display comprising three indicator sets for bass, treble and mid-range. The indicator sets may be subdivided within further frequency limits.

U.S. Pat. No. 4,081,829 entitled "Audio Activated Video Display" assigned to Atari, Inc. discloses an apparatus that presents images associated with separate stereo channels, Color is derived based on the zero crossing rate of each channel. Each channel has its own color associated with it. Objects may be solid, or rings, or one may be subtracted from the other. The different arrays may be selected automatically in a random manner.

Thus there have been many efforts at providing a visual representation of music. They fall into a mainly two categories. First, there are those that adhere closely to the presentation of a musical score. These either use static graphics to make the score more readable, or they use time varying graphics to indicate which notes are being sounded as the piece plays and to provide some information about the volume of the notes. Second, there are those that present images that entertain with pleasing visual patterns responding to the music but with no discernable informative intention regarding the structure of the music. For example, such systems might display the image of a dancer or musician playing instruments.

Another representation of music, in a non-visual form, is the Musical Instrument Data Interface (MIDI) system, which provides a binary code for transmitting a musical performance. For example, a MIDI code for a piano performance digitizes which key was struck, how hard it was struck, and how long it was sustained, etc. The MIDI code is intended to be converted back into sound by a code interpreter, which for example could produce a piano's sound emulating the audio effect of the struck key. Typically the corresponding sound is a prestored sampled sound. Thus the MIDI code could be sounded on any instrument whose sound has been sampled. For example, playing on a MIDI keyboard could allow the simulation of an organ, a trumpet, a drum, etc. The reproduced sounds do not have to correspond to any conventional instrument and may be produced electronically as opposed to sampled. Although MIDI code is somewhat successful in digitizing performance information it is not humanly readable and is designed for interpretation throughout the use of some sound production system.

Yet another successful medium for capturing sound in another medium is the sampling system used in digital recording on tape, CDs or DVDs. Since sound produced on a speaker is merely the result of electrical currents sent to the speaker, the medium records those currents in detail. In digital recording, the music is chopped up into extremely small time intervals and a voltage level is recorded (or sampled) for each interval. Only a finite number of voltage levels are recorded, which gives the recording its digital quality. Although digital recording is only an approximation to the musical sound, if the frequency range is bounded, the sampling rate is high enough, and the number of quantized levels is sufficient, the loss due to the digital approximation cannot be heard. Such digital recording became practical with the development of fast inexpensive electronics and, for the CD and DVD, the development of optical recording techniques employing lasers. Again, this technology is for reproducing sound and not for providing human readable or visual formats.

There is a huge market for musical performance, and much of its audience is uninterested in or incapable of performing what they hear. Such people have no interest in learning to read sheet music because it is difficult to achieve and is unrelated to listening to the music. Some software programs try to fill this need by offering the user the ability to assemble sound clips into a piece of music. Some of these programs have graphical interfaces in which aspects of sound clips are displayed as .wav files (a standard way of representing digitally sampled files on a computer). In those representations, the amplitude and duration of the sound are represented as a wave. Utilities are provided for attaching those waves to each other to play them in sequence, or attaching them on parallel lines to play several simultaneously, to repeat entire sections, and to modify volumes, pitch and durations. However the formats are not capable of indicating detailed musical characteristics and do not give a pictorial sense of the artistic sonic elements of the musical composition other than perhaps tempo and volume.

Importantly, it is recognized that music is organized according to a hierarchical structure and can be understood as a hierarchical event. At the lowest level, the music is comprised of individual notes that have a pitch (e.g., middle-C), a duration (e.g., a quarter note), and a timbre (harmonics at varying amplitudes that serve to distinguish, e.g., a violin from a flute). Other lower-level aspects might include the amplitude (volume) envelope or how the harmonic amplitudes vary over time. At a higher level, by way of example, the middle-C can be viewed as the third of an A-flat chord, or it could be serving as a pitch center, tonal center or the like. At an even higher level, the middle-C can be viewed as the second note of a particular motif. These levels can further incorporate higher-level structures as well: a motif within a phrase, and this, within a movement; aspects such as melodies and themes are encompassed at these higher levels. None of the existing notation systems capture the substance hierarchical structure of the music in a comprehensive manner.

What is needed is a way to create and convey visually to a listener the sense of a musical experience on a number of levels in the hierarchical structure, whether or not accompanied by the sound. What is further needed is a way to enable musical composition or the modification of existing music whether or not accompanied by the sound. Finally, what is needed is a tool that permits an artist to interact with visual display elements in a manner that both respects the form at various levels in the hierarchy while at the same time permitting artistic freedom of expression.

SUMMARY

The invention provides a tool for creating and displaying a visual representation of music that accurately and expressively conveys the musical form on a number of levels in the hierarchical structure of the music, including overall structure, event surface, orchestration, and sonic framework of the piece being visualized. Various embodiments of the invention are discussed below. These entails a novel encoding method and appertaining system for transforming recorded music into: 1) a set of musical metadata; and 2) a set of sonic metadata, that can be transformed into 3) any number of visual mappings and representations that are related to various characteristics of the recorded music.

The term "event surface" of a piece of music refers to the actual musical events that comprise the piece (i.e., individual notes) as opposed to more global aspects like themes, melodies, etc. This notion could be considered synonymous with "musical events" or an "event stream". As a musical piece unfolds in some sort of hierarchical manner, a listener is generally only immediately perceiving the musical surface, e.g., the tone color, which is the first thing the listener's ear is picking up about the piece. The listener may not be consciously aware of all of the superstructure that is underneath. Advantageously, the present invention permits a creation and visualization of not only the event surface, but also of various aspects of the underlying superstructure of the music in a representational form on a visual display. The representation comprises visual characters or sprites made of simple or complex two- or three-dimensional geometric shapes that move in time according to instructions from metadata synchronized to the actual musical recording, where the metadata can be derived from actual audio files, data files, such as MIDI files, and data created by an artist who is interacting, via a user interface, with the music using the inventive tool.

The characters accurately (i.e., according to some spatial or geometric relationship, consistent use of an attribute, such as color, shape, surface texture, etc.) portray the rhythm, pitch, and timbre of the individual elements in the musical surface (individual lines or performers) that may correspond, e.g., to tracks in a multi-track (or any form of multi-part) recording (that may be stored on any form of media in either digital or analog form), and have a hierarchy of representation, e.g., thematic elements that are divided into sub-elements (gestures or phrases) that are further divided into individual notes.

Some of the processing may be done automatically. For example, information about individual notes, their volume, duration, and possibly general timbral characteristics could be derived from the data file (e.g., a MIDI file) automatically, whereas higher level divisions, such as themes, melodies, etc. can be done manually via a tagging/annotating the analog or digital data representing the music piece so that it can be visualized synchronously with the sound. Part of the software will allow the user to define how exactly this is visualized (e.g., the user could choose to ignore certain aspects of the analysis or concentrate on ones s/he finds more or less interesting), but as complete an analysis as possible would be pre-computed as metadata for each piece. The tagging/annotating could be done in an off-line manner or in real-time, as the music is playing, using this tool.

Factors affecting the specific visual form of a character depends on parameters such as pitch (both absolute and relative to the key area of the harmonic surface), dynamic volume, and salience (how prominent a note event is psychoacoustically). This visual representation will therefore correspond to the actual structure of the music as heard, where simultaneous harmonic events are parsed into individual notes which are then tied together into a rhythmic stream of linked events providing themes, melodies, bass figures, and other musical structures.

To provide the underlying data for the visualization system, the music is analyzed both according to appropriate contemporary music theory (e.g., Piston's trilogy "Harmony", "Counterpoint", and "Orchestration") as well as hierarchical listening structures derived from formal Gestalt analysis and generative grammar modeling, as are known from, e.g., Schenker, Heinrich. *Harmony* (ISBN: 0226737349). *Five Graphic Musical Analyses* (ISBN: 0486222942); Lerdahl, Fred, and –Jackendoff, Ray. *A Generative Theory of Tonal Music* (ISBN: 026262107X); Bracewell, Ronald. *The Fourier Transform and Its Applications* (ISBN: 0073039381).

In addition, the acoustic information from the musical recording (as well as the underlying "multi-track") is analyzed to provide an accurate sonic "image" of the component timbres being visualized, using a combination of Fourier analysis, Linear Predictive Coding (see; Roads, Curtis. *The Computer Music Tutorial* (ISBN: 0262680823), and equivalent algorithms and technologies to extrapolate meaningful frequency-domain and time-domain data from a sound recording.

These two streams of data (the "musical" (note and structure-based) and the "sonic" (audiological/waveform-based) are then synchronized by an artist to the digital audio recording of the musical piece to drive the visualization. These streams allow providing a highly configurable system for expressive and complex visual representation that accurately depicts the expressiveness and complexity of the musical piece being listened to. The user ("listener-viewer") becomes familiar with this relationship between musical content and visual representation and derives from the experience a wide spectrum of intellectual stimulation and aesthetic pleasure. Advantageously, the visual relationships created can serve to introduce, enhance, or reinforce natural patterns and relationships in the music that the user may not have been aware of or focused on previously.

It should be noted that a first user, the artist, is a part of the creative process for producing the visualization, and his or her input in determining which musical parameters or rules and which part of the musical structure is associated with which displayed attributes is a part of the creative process. A second user, the viewer, is one who observes the finished visualization.

For works which are intended to be more creative and impose few restrictive constraints on the artist, a minimal set of fixed parameters or rules may be specified. For example, perhaps the only constraints imposed would be that note pitch corresponds with a vertical y-axis position on the display, and that the number of characters reflects the number of voices on the display, and all other parameters are assignable by the user: for example, the artist may assign the texture of a sprite to correspond to timbral characteristics of the note . . . a smooth texture for notes having few harmonics and a rough texture for notes having many, etc.

For works which are intended to be used as a teaching tool and to help viewers appreciate the underlying structure, more of the parameters or rules may be fixed so that the viewer can learn corresponding relationships. For example, one could always define string section portions to be represented by the color red, whereas the brass section portions could be defined to be represented by the color yellow. The idea being that at some level there is a constancy of the elements (shape, size, position, degree of opacity, movement, surface texture and surface motion, color, etc.)—minimal when great artistic expression is desired, and moderate to maximal when communication of consistent parameters is desired—but in any case defining a visual language for the underlying music.

The system can be designed to be extremely flexible in associating various aspects in the hierarchy of a musical piece and can define the constraints of the artist as freely or rigorously as desired.

DESCRIPTION OF THE DRAWINGS

The invention is described with reference to various preferred embodiments in more detail below that are illustrated in the drawing figures.

DETAILED DESCRIPTION OF THE PREFERRED EMBODIMENTS

Conversion of Musical Source Material/Data into the Musical Meta-Score

Figure 1:
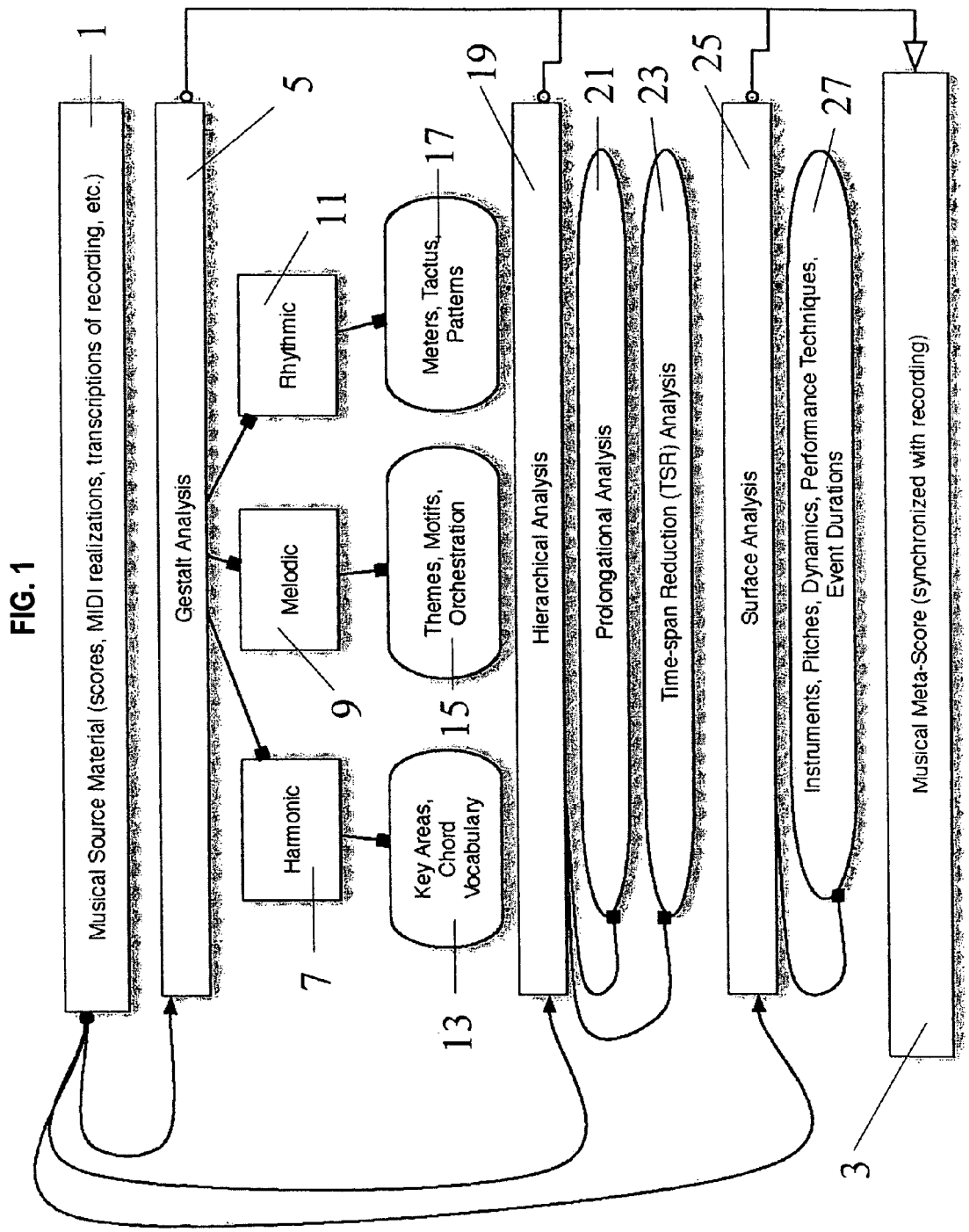
FIG. 1 is a block flow diagram illustrating a conversion of musical source data into a musical meta-score.
Figure 2:
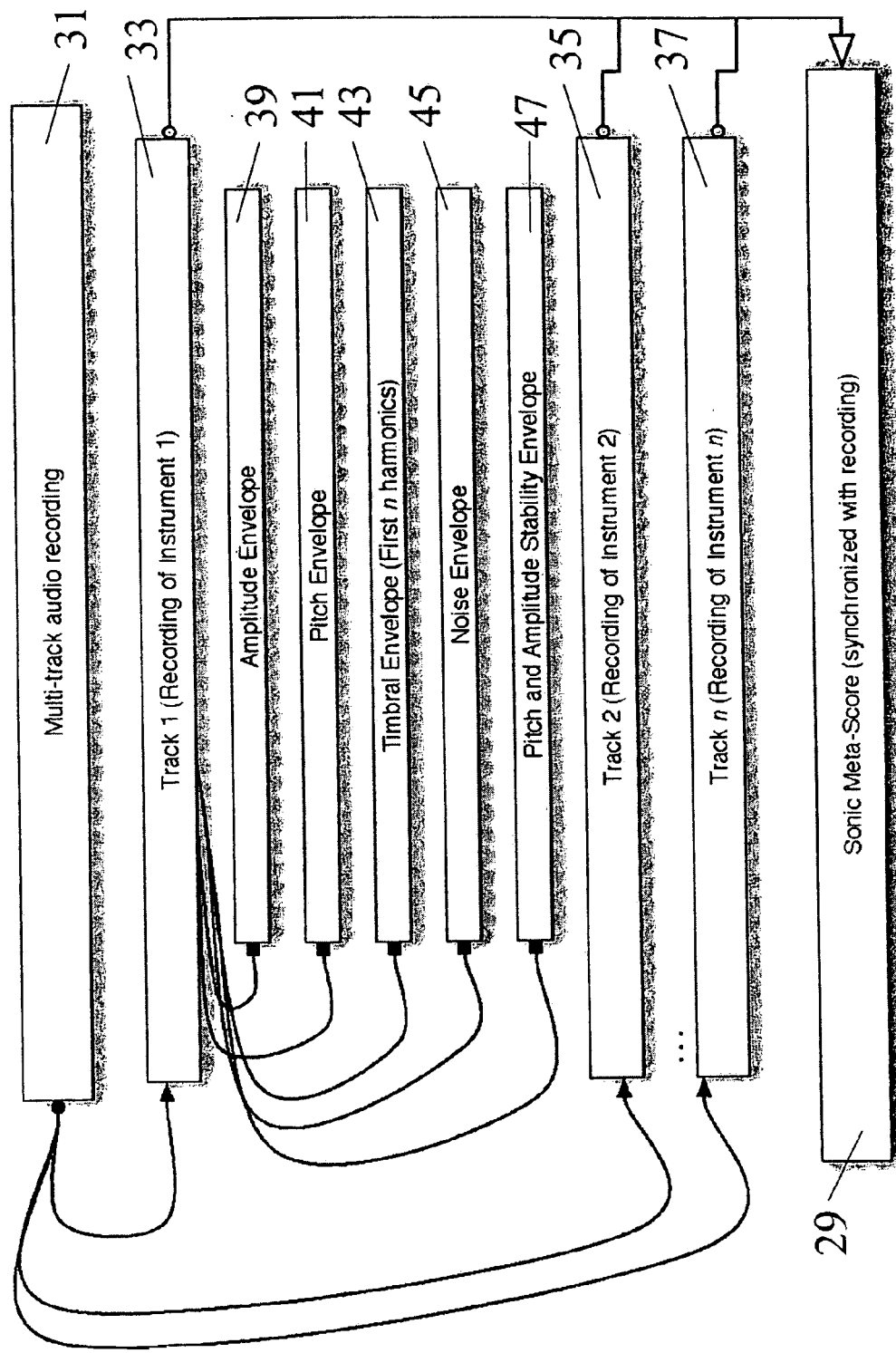
FIG. 2 is a block flow diagram illustrating a conversion of multi-track audio recording data into a sonic meta-score.
Figure 3:
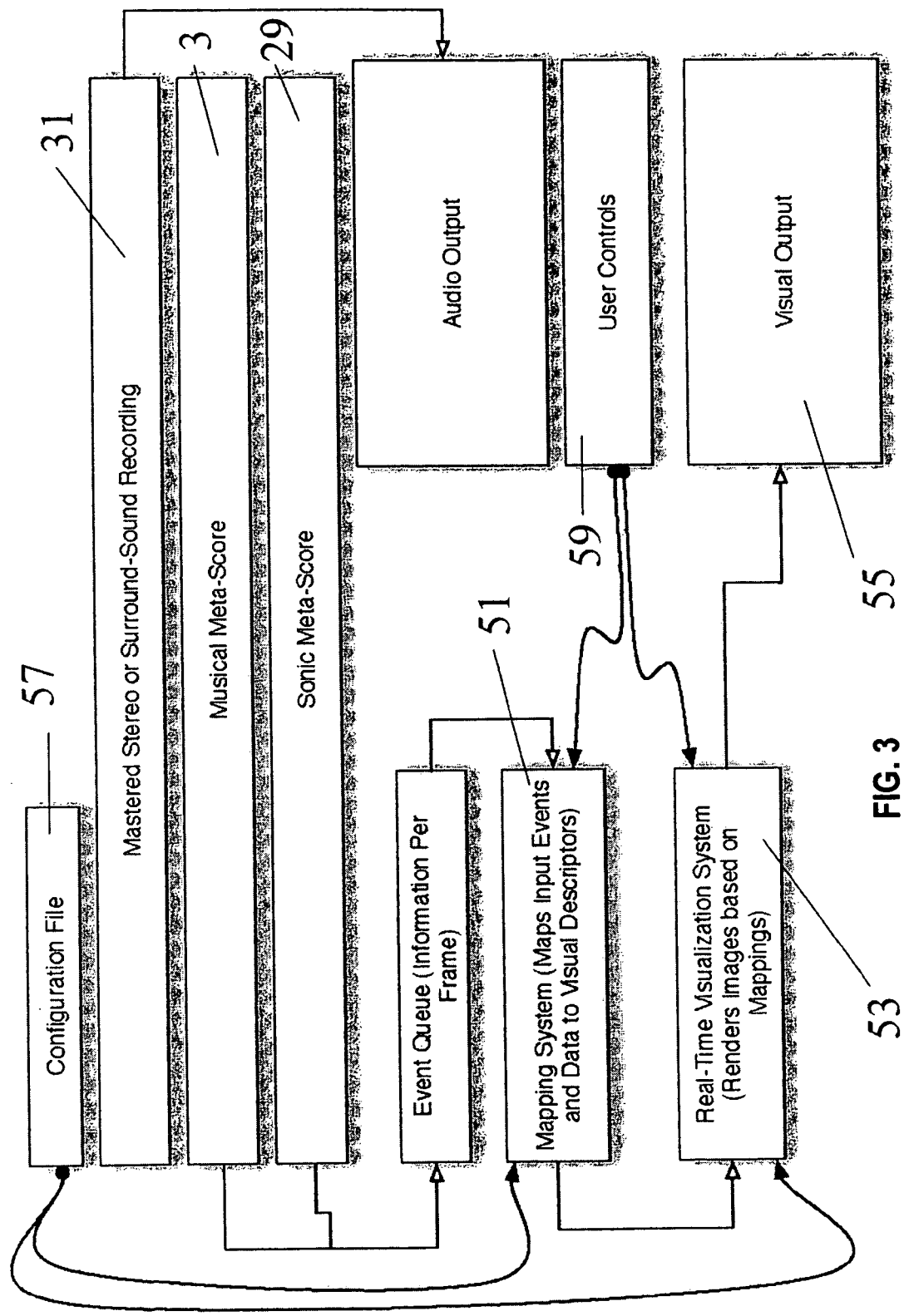
FIG. 3 is a block flow diagram illustrating the integration of the sound recording, the musical meta-score, and the sonic meta score using a configuration file into an audio output and a visual output.

From a high-level perspective, FIGS. 1 and 2 illustrate the breakdown and output of the system for the musical piece in terms of non-audio musical source material (FIG. 1), audio data (FIG. 2). The output of these breakdowns are then combined with the actual sound recording to produce a synchronized video and audio output that can be displayed to a viewer (FIG. 3)

In more detail, FIG. 1 shows the breakdown, analysis, processing and output of the non-audio data related to a musical piece. The raw data of musical source material 1 for a piece, which could include musical scores, MIDI realizations of a piece, transcriptions of the recording, and any other representational forms for a piece of music are subjected to a preparatory Gestalt (overall structural and holistic) analysis 5 according to three main encoding systems. The analysis 5 comprises harmonic 7, melodic 9, and rhythmic 11 sections. The harmonic section 7 analyzes and records information such as duration, key areas, and chord vocabulary 13. The melodic section 9 analyzes and records specific points of interest and repetition such as major themes, motifs, orchestration shifts, etc. 15. The rhythmic section 11 analyzes and records meters, tactus (beat, measure division), patterns, etc. 17.

It should be noted that these analyses can be performed either manually or, when computer-based analytical technology exists, automatically. For example, an automated computer-based analysis of key and chord structure as well as meter would be possible from an interpretation of a MIDI file. However, higher level structures, at present, do not lend themselves well to an automated analysis, for example, the identification of relevant themes or motifs. Nonetheless, additional techniques may be subsequently developed, and nothing in the invention is intended to limit any particular form of analysis to either a manual or an automatic mode. Furthermore, known score recognition technologies could be utilized to assist.

The musical source material is further subject to a hierarchical analysis 19 and a surface analysis 25. At present, these analyses would utilize some degree of manual analyses, although various computer tools could be used to assist in such an analysis.

The hierarchical analysis 19 can incorporate a prolongational analysis 21 and/or a time-span reduction analysis 23, and is performed to extrapolate thematic and structural elements that are required for the visualization but may not be immediately apparent from the musical surface or easily computable in real-time by the visualization system itself. This includes performing standard harmonic analysis, agreement on the metrical tactus, prolongational analysis 21, and time-span reduction 23 as discussed above. Finally, the musical surface is analyzed 25 to correctly encode the pitches, durations, articulations, dynamics, and other appropriate metrics 27 for all the individual musical events in the piece. See Schenker, Lerdahl & Jackendoff, cited above, as well as Lerdahl, Fred. Musical Pitch Space (ISBN: 0195178297)).

A musical meta-score 3 is produced from the output of the Gestalt 5, hierarchical 19, and surface 25 analyses. The term "meta-score" generally refers to a description or elaboration of the content of a score. (The prefix "meta" is used to describe a language descriptive of a subject rather than being in the language of the subject.) The musical meta-score 3 contains digital encodings of the pitches, rhythms, dynamics, and arrangement at a sophistication comparable to common practice Western musical notation, but with a higher degree of precision vis-à-vis pitch and the temporal event stream as necessary. The musical event stream represented in the musical meta-score 3 is synchronized to the recording, and then annotated with whatever other analysis are to be provided (e.g., to identify themes, melodies, formal boundaries, etc.).

This meta-score 3, while created descriptively (after the recording of the piece is made), may or may not rely on pre-existing proscriptive notations as a starting point, e.g., a conductor's score for a 19th Century symphonic work. Primarily, however, the score is derived from a transcriptional markup of the recording to be visualized.

The three analyses 5, 19, 25 may be combined into a single meta-file 3 with time-stamps accurate to the speed of the rendered visualization (e.g., 30 frames/second). The following table illustrates an extremely simplified example of the opening of Beethoven's Fifth Symphony. Additional tags could be added as necessary on a per-instrument basis (for example, if the violins are playing a down-bow or up-bow, if the brass is muted, etc.)

TABLE 1

Meta-Score for
Opening to Beethoven's 5th Symphony

| Time | Pitch | Volume | Duration | Harmony | Orchestration | Theme |
|---|---|---|---|---|---|---|
| 0:0:0:0 | Eb3 | ff | 1 | Cminor | (list all) | 1A |
| 0:0:1:0 | Eb3 | ff | 1 | Cminor | (list all) | 1A |
| 0:0:2:0 | Eb3 | ff | 1 | Cminor | (list all) | 1A |
| 0:0:3:0 | C3 | ff | 5 | Cminor | (list all) | 1A |

Conversion of Multi-Track Audio Recording Data into the Sonic Meta-Score

As shown in FIG. 2, a second set of meta-data is also generated (sonic meta-data 29) to describe the "sound" (i.e., pitch, timbre, volume, etc.) (as opposed to the "music", i.e., tonal relationships, etc.) in the recording, at a level of specificity to be determined by the type of musical piece.

In the most common case, and as illustrated for the embodiment discussed below, the musical work is provided on a multi-track audio recording 31, although nothing precludes the application of this technique for a single-track recording. A single-track recording comprising multiple instruments, voices, etc., (such as an old preexisting 78 RPM record) could still be musically "tagged" (i.e., pitches, rhythms, etc., could still be notated) but such a recording could not be acoustically analyzed on a per-instrument basis (and therefore, the resultant visualization would lose some complexity, e.g., one would not be able to have the symbols representing the first violin shimmer in response to violin vibrato).

For each track 33, 35, 37, which typically represents an individual instrument or voice, the recording allows the extraction of several envelopes, including the amplitude envelope 39, pitch envelope 41, timbral envelope 43, noise envelope 45, and pitch and amplitude stability envelope 47. For a musical work with only one instrument (e.g., a solo piano recital) a single track of timbral information would suffice, providing information about the tone of the piano used in the recording (including the unique timbral characteristics of the instrument) as well as a fine degree of detail about the performance that would be difficult to encode using musical descriptors (e.g., the spatial layout of the piano sound in the stereo field because of room ambience, the specific nuances of left-hand versus right-hand playing, etc.).

The "noise envelope" 45 is the volume of noisy sound in an instrumental note. For example, when a violinist draws a bow across a string, the first 20 ms or so of the note consist of colored noise (if one isolated this part, the actual pitch of the sound cannot be determined), until the bow attains enough momentum for the string to start vibrating periodically. Pitch and amplitude "stability" are ways of describing vibrato and tremolo (fluttering of the pitch and the volume, respectively, within a single note).

The information from the appertaining tracks 33, 35, 37, are combined in the sonic meta-score 29, that may be structured with time stamps, e.g., per frame, similar to that of the musical meta-score 3, and with a similar structure to that illustrated in Table 1 above, but with the appertaining information relevant to the audio information.

Production of the Final Audio and Visual Output

The musical meta-score 3 and the sonic meta-score 29 are brought together with the original recording 31 to form the final audio 63 and visual 55 output. As shown in FIG. 3, the system comprises a mapping system 51 that maps these two types of metadata 3 and 29 to a real-time visualization 53, 55 in perfect synchronization with the playback of the recording 31 by use of an event queue 61, which is able to correlate the data based on the timing information contained within the musical meta-score 3 and the sonic meta-score 29. The information in the event queue 61 may be represented per frame, although any other time-based mechanism may be used.

The mapping scheme itself 51 is designed to be highly malleable based on settings stored on the data medium (e.g., a configuration file 57) as well as configurable by the user based on specific settings or interactions which the viewer-listener can perform 59 to adjust the visualization to her/his taste, much as s/he would adjust the tone controls on a stereo receiver. The configuration file 57 could be used to make any assignment between a property related to the music and its corresponding visual display attribute, e.g., volume to size, vibrato to shimmering, harmonic components to surface texture, position to pitch, etc. The configuration file could be something as simple as a text-based file that could be edited with a simplistic text editor, or could be implemented with a much more complex program that permits specific types of tagging to be done at a high level.

The user controls 59 could be used to perform operations in either an off-line manner or in real time, as the scores and sound recording are being produced. Any known form of user interface could be utilized for the user controls—these could be done strictly on a computer with the use of a keyboard and mouse using standard drop-down menus, toolbars with symbols, or any other standards mechanism for interacting with a program. The user controls 59 could also comprise custom designed physical hardware controls, such as sliders, knobs, touch-pads, etc. that are capable of entering data values in a simplified manner, or could combine both physical and computer-based controls.

The user controls 59 and data from the configuration file 57 provide inputs to the mapping system 51, which maps input events and data to visual descriptors related to, e.g., the sprites of the visual display. The mapping data thus produced is fed into the real-time visualization system 53 that also accepts inputs from the configuration file 57 and the user controls 59.

The details of the preferred scheme for deriving information from the two meta-data files 3, 29 and visualizing it on a per-frame basis is contained in the exemplary pseudo code listing in Appendix A.

Maxcode Implementation Embodiment

An explicit code implementation according to an embodiment of the invention in MaxCode is presented in Appendix B. Max is a visual programming language developed and maintained by San Francisco-based software company Cycling'74 (www.cycling74.com). It has its origins in a program called "patcher" written by Miller Puckette at IRCAM/Paris in 1987. A complete description of the Max language can be found in the Max Reference Manual by Chris Dobrian and David Zicarelli, Cycling '74 (2000-2005).

Figure 5:
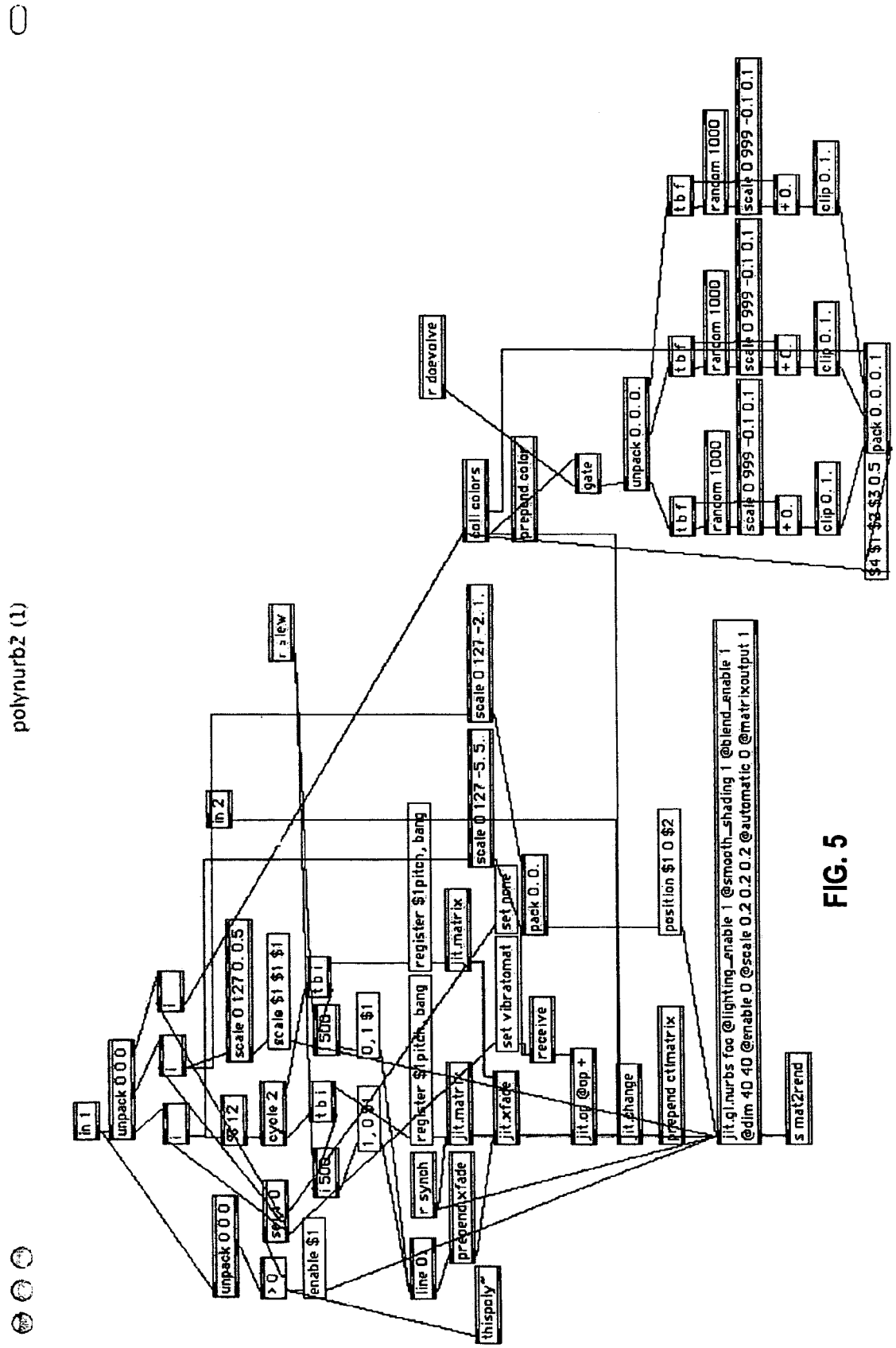
FIGS. 5 & 6 are hierarchical illustrations of the graphic interface generators of the code using the Max visual development environment.
Figure 6:
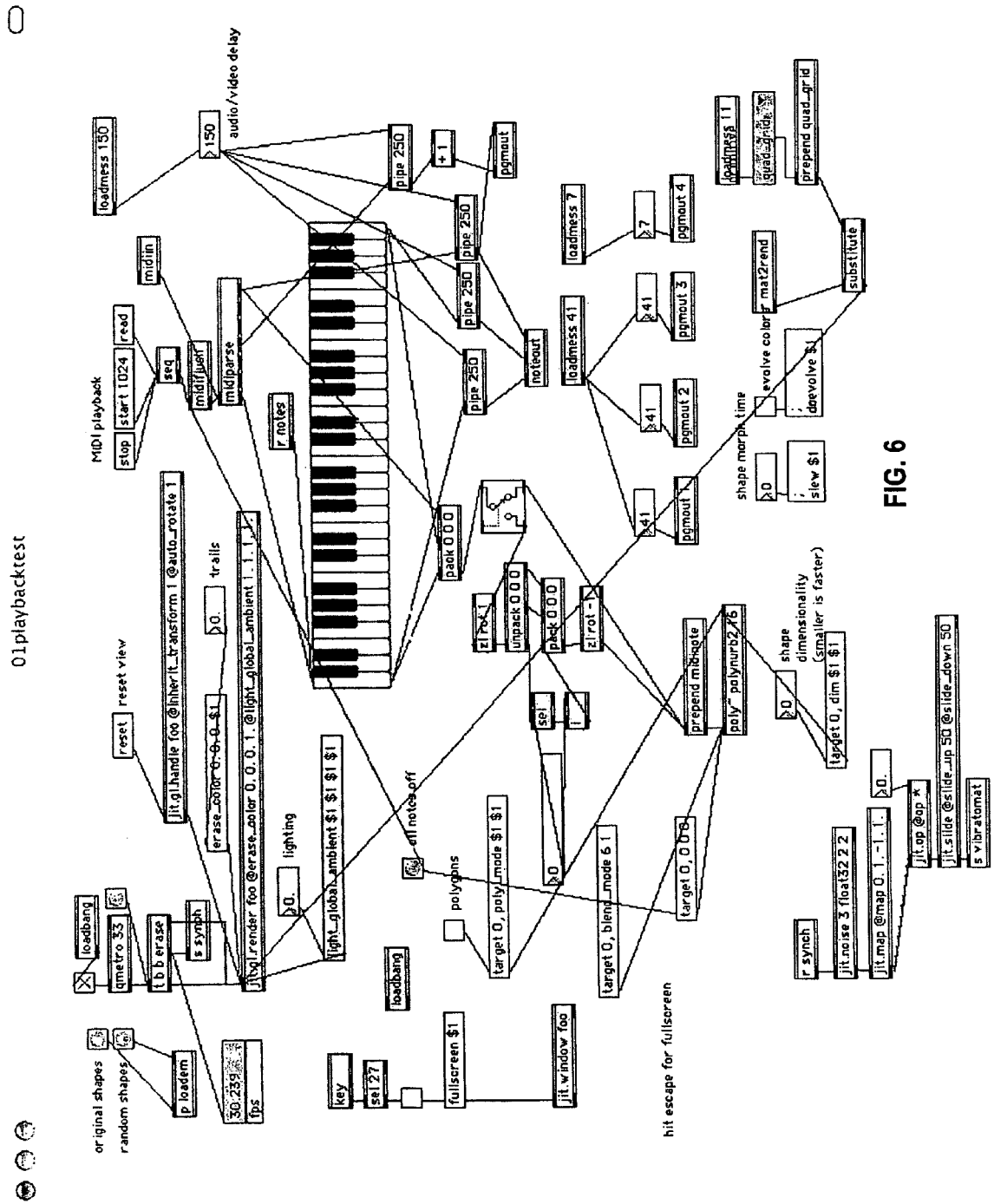

The textual representations of the program (#X, #P, etc.) are difficult to interpret in raw form, and the only practical way to understand a Max program is to look at the visual function graph (FIGS. 5 and 6); his is what differentiates Max from a procedural programming language (C or Java); the visual layout of the program defines its function.

Visualization System and Display

FIGS. 4A-4M illustrate exemplary types of visual outputs 55 that can be achieved using the visualization system 53. Although the following discussion relates to what is shown in these figures, the visualization is best experienced according to the multimedia demonstration submitted as an Exhibit with this application, which illustrates the color, motion, and synchronization that is impossible to illustrate in the Figures.

Figure 4A:
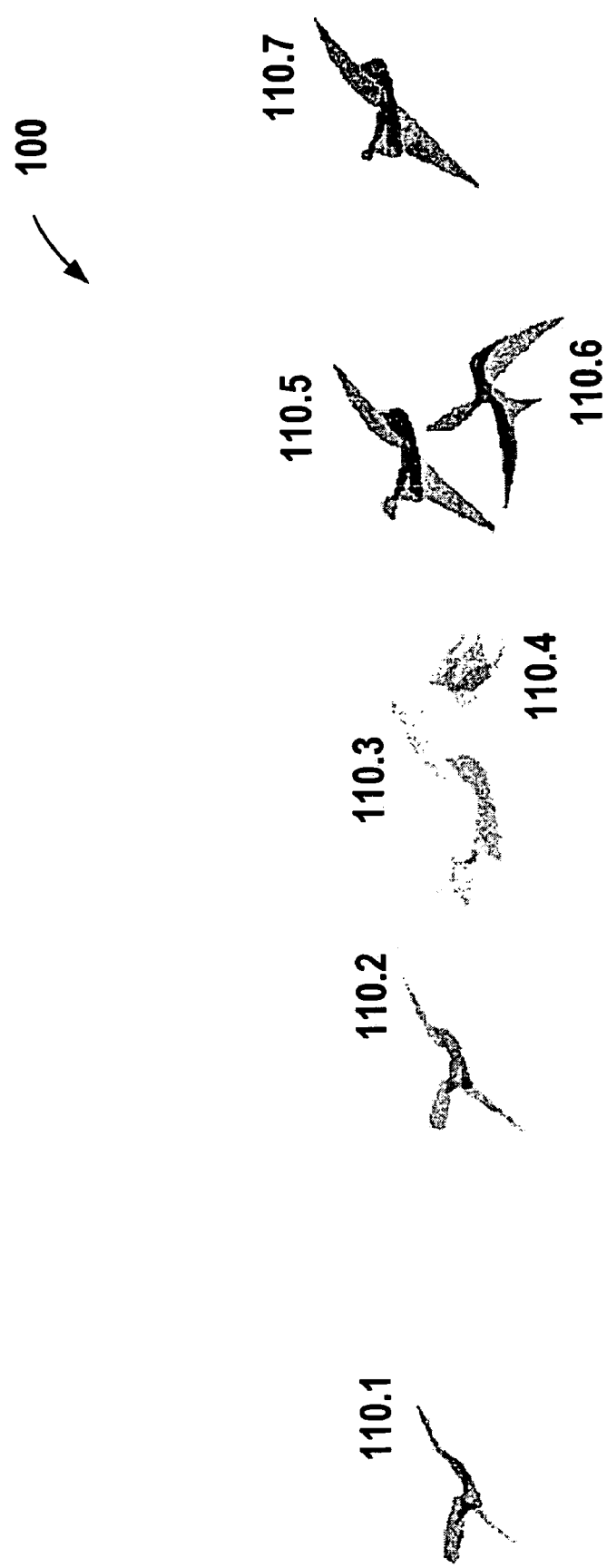
FIGS. 4A-M are exemplary screen shots of frames for the visual output.

FIG. 4A illustrates a display 100 showing how a mapping scheme for a typical embodiment of a musical work could map specific musical lines (e.g., different instruments in an orchestral work, different voices in polyphonic texture, such as a piano work, or different tracks of a multi-track recording) to a series of two- or three-dimensional objects or sprites 110.1 to 110.7 in a virtual scene (or "world") on the screen display 100.

Figure 4B:
Figure 4C:
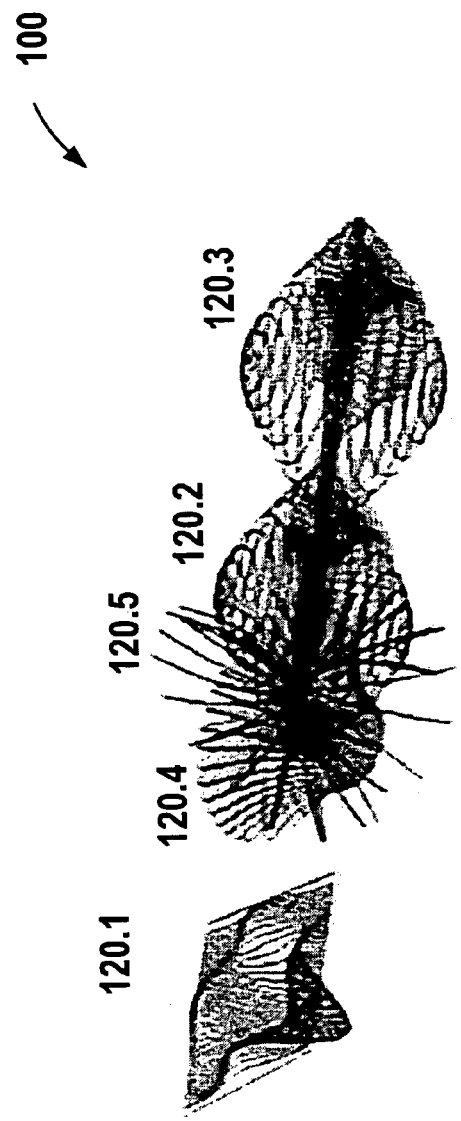
Figure 4D:
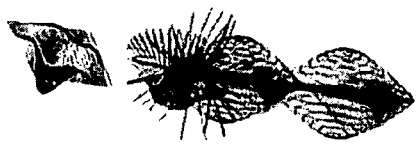
Figure 4I:
Figure 4E:
Figure 4J:
Figure 4F:
Figure 4K:
Figure 4G:
Figure 4L:
Figure 4H:
Figure 4M:

FIGS. 4B and 4C illustrate, by way of example, how the shapes of these "voice objects" 120.1 to 120.3 could morph among a set of fixed geometric shapes according to, e.g., the pitch classes they play, in such a way that, for example, two instruments playing the same pitch class an octave apart (or integer numbers of octaves apart) would be immediately recognizable by a shared shape 120.2, 120.3 for their voice object. This assists the user in more fully appreciating the underlying structure of the music.

As the musical composition progresses, one of the objects 120.1 has moved downward, rotated about an axis parallel with the display surface, and changed its shape slightly. The objects representing the same pitch class 120.2, 120.3 have also experienced a similar transformation. New musical lines have entered, as are illustrated by the introduction of additional objects 120.4 and 120.5.

To illustrate various mappings that could be performed, volume of the individual pitches could be mapped to the size of the object, and color could be implemented to cue the viewer-listener into a number of shared parameters by, for example, grouping instruments of the same family to a shared color space.

The spatial layout of these shapes in relationship to each other and in relationship to the viewpoint of the virtual camera into the world could be determined by various factors including the predominant harmony of the musical surface at that time or the salience of a particular voice in the musical structure, where the camera would pivot toward the most prominent melodic line or Haupstimme (the most important polyphonic voice in a passage). As new notes are introduced, previous notes would recede in space or opacity to provide a visual transition equivalent to short-term musical memory.

More complex graphical elements are introduced to link together the musical hierarchy of the piece as it unfolds. As a result, lines or other trail markings can appear to connect melodic fragments, motifs, themes, etc., with specific visual cues used to mark out formal points in the musical structure according to the analysis undertaken on the musical meta-score prior to the visualization. The result is that the viewer-listener can experience a geo-spatial "history" of the performance as it unfolds and will be graphically informed of recurring patterns in the music through recurring visualized events. FIGS. 4D-4M provide exemplary illustrations of various visual representations that can be achieved.

Referring back to FIG. 3, the sonic meta-data 29 encoded off of the components of the recording itself 31 can be applied to add nuance and character to the generated graphics. For example, the specific contour and shape of a solo violinist's vibrato, easily encoded into the sonic meta-data 29, can be applied to the violinist's voice object 120.1 as a shimmering texture on the surface of the object in perfect synchronization, providing important visual cues as to the performance practice and technique used in the recording. In this manner, a great deal of information can be imparted to a viewer regarding the underlying musical structure without even hearing the accompanying music.

Via the user controls 59, the user can, e.g., selectively isolate voices, freeze, zoom, and pan around the scene in a fluid manner to investigate the visualization or set up a particular vista in three-dimensional space from which to view the rest of the piece. This capacity to view the scene from any angle, as it were, allows for a user to make an informed decision on how best to utilize the system for a particular musical work.

The specific visualization objects, their shapes, drawing styles, animation actions, and mapping interactions with the score, one another and with the scene overall are implemented in a portable, easily encapsulated algorithm that defines the "look" of the visualization independent of the underlying data supplying it. As a result, a variety of "looks" can be developed and experiments with for different styles of musical content, much as one would approach production design in the performing arts. These values can be stored in the configuration file 57, e.g., and will depend on the particular visualization used; for the example provided, this could include the location and angle of the camera, the palette of colors used in the sprites, the speed at which the scene rotates (if at all), geometric models of the particular shapes used when drawing the sprites, etc.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

APPENDIX A

```
Function Initialize( )
{
    Read Configuration File and Define Parameters( )
    {
        PCM = Name of Audio File
        MMDF = Name of Musical Meta-Data File
        SMDF = Name of Sonic Mete-Data File (SMDF)
        Visualizer = Name of Visualization Algorithm to use
        FPS = Frames Per Second for Visualization
        Mapping_System = Structure of Meta-Data to Visual Events
    }
    Open PCM For Buffered Playback( )
    Open MMDF For Buffered Playback( )
    Open SMDF For Buffered Playback( )
    Load Visualizer and Initialize
    {
        Initialize Graphics Engine
        Define Initial Camera View and Projection
        Load Initial Textures, Geometries, and Shaders
        Setup Initial Blending and Color Rules
    }
    Setup Callback Functions for User Interaction( )
    {
        Callback Function CallbackFun( )
    }
    Current_Frame = 0
    Schedule and Start Playback Clock at FPS( )
    {
        Do_Playback (Current_Frame)
        Wait 1000/FPS Milliseconds and Increment Current Franc
        Loop
    }
}
Function Do_Playback (Current_Frame)
{
    Read Current_Frame of Data from MNDF into Event_Queue
    {
        //      Gestalt Analysis
        Test For New Key( )
        Test For New Meter( )
        Test For New Theme( )
        Test For End of Existing Theme( )
        Test for New Harmony( )
        //      Hierarchical Analysis
        Test for New Branch Level (TSR)
        Test for Prolongational Level
        //      Surface Analysis
        Add new Events to Queue
        {
            Instrument Number
            Note On/Off
            Dynamic Level
            Performance Technique
        }
    }
    Read Current_Frame of Data from SMDF into Event_Queue
    {
        Iterate Through Track List
        {
            For Each TRACK Find . . .
                Amplitude [TRACK]
                Pitch [TRACK]
                Harmonics [TRACK]
                Noise [TRACK]
                Vibrato [TRACK]
                Tremolo [TRACK]
        }
    }
    Merge MMDF and SMDF Events and Correlate Them
    {
        Sort MMDF Surface Events to Match SMDF Track Events
        Tag MMDF Surface Events based on Hierarchical Analysis
        Update Event Queue
    }
    Do_Map (Event_Queue)
```

APPENDIX A-continued

```
}
Function Do_Map (Event_Queue)
{
    Get Mapping_System
    Flush Graphics_Queue
    Iterate Through Event_Queue
    {
        Look up Event in Mapping System
        If Event has a Visual Descriptor
        {
            Add corresponding Descriptor to Graphics Queue
        }
    }
    Do_Visualize (Graphics_Queue)
}
Do_Visualize (Graphics Queue)
{
    Get Callbacks
    Erase Dffscreeo
    Copy State from Previous Frame
    Iterate Through Graphics_Queue
    {
        Alter Previous State based on Graphics Queue . . .
            Create New Shapes
            Update Previous Shapes (Color, Texture, etc.)
            Change Global Camera
            Delete Shapes that correspond to expired events
    }
    Draw Graphics into Dff screen and Swap in New Image
}
CallbackFun( )
{
    Iterate through User Inputs
    {
        Set any new commands in Callbacks for use in next frame
    }
}
```

APPENDIX B

```
    playbacktest (main max patcher):
    max v2;
    #N vpatcher 33754 1209 737;
 5  #P window setfont 'Sans Serir 9.;
    #P window linecount 1;
    #P hidden newex 141 24045196617 loadbang;
    #P hidden message 149 390 123 196617 target 0 \,
    blend mode 6 1;
10  #P comment 38 5375 196617 random shapes;
    #P hidden newex 1792645 196617 loadbang;
    #P comment 76613689196617 audio/video delay:
    #P window linecount 3;
    #P comment 38651796 196617 shape dimensionality
15  (smaller is faster);
    #P window linecount 1;
    #P comment 583 506 88 196617 evolve colors;
    #P comment 504 488 88 196617 shape morph time;
    #P comment 357 55 58 196617 reset view;
20  #P comment 450 121 34 196617 trails;
    #P comment 246 170 42 196617 lighting;
    #P comment 734 484 48 196617 primitive;
    #P comment 20928348 196617 polygons;
    #P hidden newex 544 16541 196617 r notes;
25  #P hidden newex 73547865 196617 loadmess II;
    #P hidden newex 657 56654 196617 substitute;
    #P hidden newex 735 53391196617 prepend quad grid;
    #P user ubumenu 73550468 196517011 0;
    #X add points;
30  #X add lines;
    #X add line_strip;
    #X add line_loop;
    #X add triangles;
    #X add tn_strip;
35  #X add tn_fan
    #X add quads;
    #X add quad_strip;
```

APPENDIX B-continued

```
#X add polygon;
#X add tn grid;
#X add quad_grid;
#X prefix_set 0 0 <none> 0;
#P hidden newex 642 50350 195517 rmat2rend;
#P button 11534 150;
#P hidden newex 240 630 183 195617 jit.slide
@slide_up 50 @slide_down 50
#P hidden newex 161 52743 196617 r synch;
#P hidden newex 161 555 109 196617 jit.noise 3
float32 2 2;
#P hidden newex 161 580 123 196617 jitmap ~map
0.1.–i. 1.;
#P hidden flonum 291 5833590003000221 221 221 222
222 222 0 0 0;
#P hidden newex 240 60964 196617 jit.op @op *;
#P hidden newex 240 651 65 196617 s vibratomat;
#P toggle 567 504 150;
#P window linecount 2;
#P hidden message 567 525 54 196617 \; doevolve
\$1;
#P number 506 504 35 9 0 0 0 3 0 0 0 221 221 221 222
222 222 0 0 0;
#P hidden message 50552645196617\; slew\$1;
#P button 11552 150;
#P number 348 516 35 9 0 0 0 3 0 0 0 221 221 221 222
222 222 0 0 0;
#P window linecount 1;
#P hidden message 312 551 99196617 target 0 \, dim
\$1 \$1;
#P button 234 253 15 0;
#P hidden newex 573 10950 196617 midiflush;
#P hidden newex 7134371 196617 loadmess 150;
#P number 754 1183590003000221 221 221 222 222 222
0 0 0;
#P hidden message 203 445 75 196517 target 0 \. 0 0 0;
#P hidden number 229 352 95 9 0 0 0 3 0 0 0 221 221
221 222 222 222 0 0 0;
#P hidden newex 341 369 27 196617 i;
#P hidden newex 341 34527 196617 sel;
#P hidden newex 397 380 48 196617 zl rot –1;
#P hidden newex 396 353 55 196617 pack 000;
#P hidden newex 397 327 65 196617 unpack 0 00;
#P hidden user gswitch2 483 311 3932 1 0;
#P hidden newex 397 304 43 196617 zl rot 1;
#P hidden newex 748 278 27 196617 + 1;
#P hidden newex 731 248 48 196617 pipe 250;
#P hidden newex 740 322 41 196617 pgmout;
#P hidden newex 680 29448 196617 pipe 250;
#P hidden newex 631 29548 196617 pipe 250;
#P hidden newex 56929948 196617 pipe 250;
#P flonum 208 158 35 9 0 0 0 3 0 0 0 221 221 221 222
222 222 0 0 0;
#P hidden message 175 198 162 196617
light_global_ambient \$1 tSI \$1 \$1;
#P hidden newex 677 370 59 196617 loadmass 7;
#P hidden newex 590 359 55 196617 loadmess4l;
#P hidden number 595 421 35 9 0 0 0 3 0 0 0 221 221
221 222 222 222 0 0 0;
#P hidden number 636 422 35 9 0 0 0 3 0 0 0 221 221
221 222 222 222 0 0 0;
#P hidden number 556 424 35 9 0 0 0 3 0 0 0 221 221
221 222 222 222 0 0 0;
#P hidden number 480 419 35 9 0003000221 221 221
222 222 222 0 0 0;
#P hidden newex 69344650 196617 pgmout4;
#P hidden newex 622 446 50 196617 pgmout 3;
#P hidden newex 545 447 50 196617 pgmout 2;
#P hidden newex 474 447 50 196617 pgmout 1;
#P hidden newex 663 74 35 196617 midiin;
#P hidden newex 336 45 285 196517 prepend midinote;
#P message 530 57 27 195617 stop;
#P hidden newex 576 13092 196617 midiparse;
#P message 559 57 59 196617 start 1024;
#P message 620 57 29 196617 read;
#P hidden newex 592 87 27 196617 seq;
#P hidden newex 449 280 55 196617 pack 000;
#P hidden newex 589 343 42 196617 noteout;
#P hidden newex 336 479 95 195617 poly~ polynurb2 161
#P toggle 190 281 150;
#P hidden message 163313131 196617 target 0 \,
poly_mode\$1 \$1;
#P flonum 411 119 35 9 0 0 0 3 0 0 0 221 221 221 222
222 222 0 0 0;
#P hidden button 21448 150;
#P hidden message 254 119 114 196617 erase_color 0.
0. 0. \$1;
#P hidden message 71 280 69 196617 fullscreen \$1;
#P hidden toggle 71 250 150;
#P hidden newex 71 224 35 196617 eel 27;
#P hidden newex7l 200 40 196617 key;
#P user jit.tpsgui 6112860 1966170;
#P message 32254 33 196617 reset;
#P hidden newex 275 89 254 196617 jitgl,handle foo
@inherit transform 1 @autojotate 1;
#P hidden newex 71 357 74 196617 jitwindow too;
#P hidden toggle 15525 150;
#P hidden newex 177 10443 IQSSI7ssynch;
#P hidden newex 155 77 55 196617 t b b erase;
#P hidden newex 1554955195617 qmetro 33;
#P hidden newex 155 142 345 196617 jit.gl.render too
@erase~color 0. 0. 0. 1 ©light_global_ambient 1 1 1
#N vpatcher4o 104 1188 542;
#P inlet 13820150;
#P inlet 385 22 15 0;
#P window setfont "Sans Serif" 9,;
#N vpatcher 20 74 620 474;
#P window settont "Sans Serif" 9.;
#P newex 32 173 123 196617 jitmap ©map 0 | ~1
#P newex 48 12140 196617 uzi 12;
#P outlet 241 243 15 0;
#P outlet 222 242 150;
#P outlet 203 241 150;
#P outlet 184 240 15 0;
#P outlet 165239150;
#P outlet 146 238 150;
#P outlet 127237150;
#P outlet 108 236 150;
#P outlet 89 235 15 0;
#P outlet 70 234 15 0;
#P outlet 51 233 15 0;
#P outlet 32232 150;
#P newex 33202293 196617 jit.cycle 12;
#P newex 30 145 109 196617 )itnoise 3 tloat32 44;
#P inlet 16286150;
#P connect 1501 0;
#P connect 1 0 160;
#P connect 2 0 3 0;
#P connect 16 0 2 0;
#P connect 00150;
#P connect 2 1 4 0;
#P connect 2 2 5 0;
#P connect 2 3 6 0;
#P connect 24 7 0;
#P connect 2 5 8 0;
#P connect 2 6 9 0;
#P connect 2 7 100;
#P connect 2 8 11 0;
#P connect 29 120;
#P connect2lo 130;
#P connect2ll 140;
#P pop;
#P newobj 387 72 393 196617 p randomize;
#P button 38645150;
#P newex 107416991 196617 jitmatrix llpitch;
#P message 107413861196617 read 11jxf;
#P newex 988 169 91196617 jitmatrix IOpitch;
#P message 988 13861196617 read 10,jxf;
#P newex 902 16985 196617 jit.matrix 9pitch;
#P message 902 138 55 196617 read 9jxf;
#P newex 816 169 85 196617 jitmatrix Spitch;
#P message 816 13855196617 read 8jxt;
#P newex 723 16985 196617 jitmatrix 7pitch;
#P message 723 13855196617 read 7jxf;
#P newex 637 169 85 196617 jitmatrix Spitch;
#P message 637 138 55 196617 read 6.jxf;
#P newex 551 16985 196617 jit.matrix Spitch;
```

APPENDIX B-continued

```
195 #P message 551 138 55 196617 read 5jxf;
    #P newex 465 16985 196617 jit.mathx 4pitch;
    #P message 465 138 55 196617 read 4jxf;
    #P newex 379 16985 196617 jitmatrix 3pitch;
    #P message 379 13855 196617 read 3.jxt;
200 #P newex 293 169 85 196617 jit matrix 2pitch;
    #P message 293 138 55 196617 read 2.jxf;
    #P newex 207 169 85 196617 jit.matrix lpitch;
    #P message 207 13855 196617 read ljsf;
    #P newex 121 16985 196617 jit.matnx Opitch;
205 #P message 121 13855 196617 read 0jxf;
    #P newex 121 7845 196617 loadbang;
    #P connect 28 0 0 0;
    #P connect 0 0 1 0;
    #P connect 26 02 0;
210 #P connect 1 0 2 0;
    #P connect 0 0 3 0;
    #P connect 26 1 4 0;
    #P connect 3 04 0;
    #P connect 0 0 5 0;
215 #P connect 26 2 6 0;
    #P connect 5 0 6 0;
    #P connect 0 0 7 0;
    #P connect 26 3 8 0;
    #P connect 7 0 8 0;
220 #P connect 27 0 25 0;
    #P connect 25 0 26 0;
    #P connect 0 0 9 0;
    #P connect 264100;
    #P connect 9 0 10 0;
225 #P connect 0 0 11 0;
    #P connect 26 5 12 0;
    #P connect 11 0 12 0;
    #P connect 0 0 130;
    #P connect 266 140;
230 #P connect 130 140;
    #P connect 00150;
    #P connect 267 160;
    #P connect 150160;
    #P connect 0 0 17 0;
235 #P connect 268 180:
    #P connect 170 180;
    #P connect 00 190;
    #P connect 26 9 20 0;
    #P connect 19 0 20 0;
240 #P connect Oo2l 0;
    #P connect 26 10 22 0;
    #P connect 21 0 22 0;
    #P connect 0 0 23 0;
    #P connect 26 11 24 0;
245 #P connect 23 0 24 0;
    #P pop;
    #P hidden newobj 66 9348 196617 p loadem;
    #P userk slider 371 193 54 0 36483112 1128 128 128 128
    128 128 255 255 255 0 0 0 0 0 0;
250 #P comment 255 254 63 196617 all notes off;
    #P comment 53 339 7 196617 MIDI playback;
    #P comment 38 35 75 196617 original shapes;
    #P comment 474 32 119 196617 hit escape for fullscreen;
    #P hidden connect 8 11 4 0;
255 #P hidden connect 79 0 5 0;
    #P hidden connect 150 15 0;
    #P hidden connect 160 170;
    #P hidden connect 170 180;
    #P hidden connect 18011 0;
260 #P hidden connect 67 05 1;
    #P hidden connect 950 100;
    #P hidden connect 10 0 7 0;
    #P hidden connect 7 0 8 0;
    #P hidden connect 20 0 8 0;
265 #P hidden connect 83 0 6 0;
    #P hidden connect 44 0 6 0;
    #P hidden fasten 8260204 131 150 131;
    #P hidden connect 8 0 6 0;
    #P hidden connect 19060;
270 #P hidden connect 12 0 6 0;
    #P hidden connect 77 0 76 0;
    #P hidden connect 76 0 75 0;
    #P hidden connect 23 0 22 0;
    #P hidden connect 45 044 0;
275 #P hidden connect 8 1 9 0;
    #P hidden connect 64 0 60 0;
    #P hidden connect 75 0 73 0;
    #P hidden connect 73 0 78 0;
    #P hidden connect 78 0 72 0;
280 #P hidden connect 21 0190;
    #P hidden connect 130 12 0;
    #P hidden connect 74 073 1;
    #P hidden connect 66 0 65 0;
    #P hidden connect 56 0 32 0;
285 #P hidden connect 53 1 32 0;
    #P hidden connect 97 0 24 0;
    #P hidden connect 60 0 24 0;
    #P hidden connect 32 0 24 0;
    #P hidden connect 54 0 57 0;
290 #P hidden connect 57 0 58 0;
    #P hidden connect 59 0 57 1;
    #P hidden connect 59 0 58 1;
    #P hidden connect 85 04 0;
    #P hidden connect 30 0 4 0;
295 #P hidden connect 58 0 55 0;
    #P hidden connect 53 0 52 0;
    #P hidden connect 52 0 54 0;
    #P hidden connect 55 0 56 0;
    #P hidden connect 54 1 55 l;
300 #P hidden connect 65 0 24 1;
    #P hidden connect 22 0 24 1;
    #P hidden connect 54 2 55 2;
    #P hidden connect 4 0 26 0;
    #P hidden connect 4 1 26 l;
305 #P hidden connect 38 0 34 0;
    #P hidden connect 42 0 38 0;
    #P hidden connect 30 6 26 2;
    #P hidden connect 69 068 0;
    #P hidden connect 26 0 53 1;
310 #P hidden connect 39 0 35 0;
    #P hidden connect 42 0 39 0;
    #P hidden connect 71 0 70 0;
    #P hidden connect 4 046 0;
    #P hidden connect 27 0 63 0;
315 #P hidden connect 64 0 63 0;
    #P hidden connect 33 0 30 0;
    #P hidden connect 63 0 30 0;
    #P hidden connect 46 0 25 0;
    #P hidden connect 31 0 27 0;
320 #P hidden connect 28 0 27 0;
    #P hidden connect 29 0 27 0;
    #P hidden connect 47 0 25 1;
    #P hidden connect6l 0461;
    #P hidden connect 48 025 2;
325 #P hidden connect 40 0 36 0;
    #P hidden connect 4 1 470;
    #P hidden connect 420400;
    #P hidden connect 80 0 83 0;
    #P hidden connect 610471;
330 #P hidden connect 30 6 48 0;
    #P hidden connect 41 0 37 0;
    #P hidden connect 43 041 0;
    #P hidden connect 82 083 1;
    #P hidden connect 610481;
335 #P hidden connect 30 3 50 0;
    #P hidden connect 84 0 81 0;
    #P hidden fasten 811 82 0 769 526 740 526;
    #P hidden connect 51 0 49 0;
    #P hidden connect 50 0 51 0;
340 #P hidden connect 62 0 61 0;
    #P hidden connect 61 0 50 1;
    #P hidden connect 48 049 1;
    #P pop;
    polynurb2 (ancillary max patcher for the visualization
345 algorithm);
    max v2;
    #N vpatclier 371 109 1250 680;
    #P origin -19 -20;
    #P window setfont "Sans Serif" 9;
350 #P window linecount 1;
    #P newex 128 472 60 196617 s mat2rend;
```

APPENDIX B-continued

```
    #P message 26428845 196617 set none;
    #P message 18828875 196617 set vibratomat;
    #P newex 12836453 196617 jitchange;
355 #P newex 181 30943 196617 receive;
    #P newex 12833563 196617 jit.op ~op +;
    #P newex 18617333196617 i 500;
    #P newex 9417233 196617 i 500;
    #P newex 442 14638196617 rslew;
360 #P message 496 52584 196617 \$4 151 t$2 153 05;
    #P newex 578 52574 196617 pack 000 1;
    #P newex 73440127 196617 tbt;
    #P newex 735 49349 196617 clip 0 1;
    #P newex 735 468 27 196617 + 0;
365 #Pnewex735 444 103 196617 scaleOggg-01 01;
    #P newex 735 423 69 196617 random 1000;
    #P newex 62940127 196617 tbf;
    #P newex 63049349196617 clip 0 1;
    #P newex 63046827196617 + 0;
370 #P newex 630 444 103 196617 scale 0999 -01 01;
    #P newex 63042369 196617 random 1000;
    #P newex 52440127 196617tbf;
    #P newex 52549349 196617 clip 0 1;
    #P newex 525 468 27 196617 + 0;
375 #P newex 525 444 103 196617 scale 0999-01 01;
    #P newex 525 423 69 196617 random 1000;
    #P newex 554 372 75 196617 unpack o 0 0;
    #P newex 552 341 27 196617 gate;
    #P newex 614 242 55 196617 r doevolve;
380 #P newex 402 271 91196617 scale 0127-2 1;
    #P newex 263 305 53 196617 pack 0 a;
    #P message 190 14475 196617 scale 151 \$1 \$1;
    #P newex 1737627196617 i;
    #P newex 182 11892196617 scale 0127005;
385 #P message 1842004319661701,1 151;
    #P newex 52 257 72 196617 prepend xfade;
    #P newex 29 23240 196617 line 0;
    #P message 12420043 196617 1 l, 0 151;
    #P newex 143 170 27 196617 t b i;
390 #P newex 223 16827 196617tbi;
    #P newex 81 23343196617 rsynch;
    #P newex 12828648 196617 jitxfade;
    #P newex 24025654 196617 jitmatrix;
    #P message 240 233 110 196617 register 151 pitch 1,
395 bang;
    #P newex 128 13942 196617 cycle 2;
    #P newex 2147527 196617 i;
    #P newex 1297827 196617
    #P newex 66 14040 196617 sel 1 0;
400 #P newex31 10865196617 unpack 000;
    #P message 26339283 196617 position 151 0 152;
    #P newex 307 271 91196617 scale 0 127 -5 5;
    #P newex 520 300 70 196617 prepend color;
    #N coil colors;
405 #P newobj 52026955 196617 coll colors;
    #P message 30 165 52 196617 enable 151;
    #P newex 3013827196617>0;
    #N in 2;
    #P newobj 333 10625196617 in 2;
410 #P window linecount 2;
    #P newex 128 428 342 196617 jit.gl.nurbs too
    @lighting_enable | ~smooth_shading |
    @blenCenable 1 @dim 40 40 @enable 0 @scale 02
    02 0.2 @automatic 0 1~matrixoutput 1;
415 #P window linecount 1;
    #P newex 128 391 90 196617 prepend ctlmatrix;
    #P newex 128 256 54 196617 jitmatrix;
    #P message 128 233 110 196617 register\$lpitch\.
    bang;
420 #P newex 128 11433196617% 12;
    #P newex 1324465 196617 unpack 000;
    #N in 1;
    #P newobj 13222 25 196617 in 1;
    #P newex 0273 51196617 thispoly-;
425 #P connect 9 0 0 0;
    #P connect 26 0 27 0;
    #P connect 29 0 27 0;
    #P connect 15 1 90;
    #P connect 90 100;
```

APPENDIX B-continued

```
430 #P connect 1 0 150;
    #P connect 27 0 28 0;
    #P connect9o 160;
    #P connect 25 0 56 0;
435 #P connect 56 026 0;
    #P connect 17030;
    #P connect 30190;
    #P connect 25 14 0;
    #P connect 23 0 5 0;
440 #P connect 4 0 5 0;
    #P connect 5 0 22 0;
    #P connect 28 0 22 0;
    #P connect 22 0 58 0;
    #P connect 58 0 60 0;
445 #P connect 60 0 6 0;
    #P connect 32 0 7 0;
    #P connect 14 0 7 0;
    #P fasten 12070525366 133 366;
    #P connect 6 0 7 0;
450 #P fasten 807 0338365 133 365;
    #P connect ID 0 7 0;
    #P connect 23 0 7 0;
    #P connect 7 063 0;
    #P connect 160 170;
455 #P connect l 0 2 0;
    #P connect 190250;
    #P connect 20171;
    #P fasten 21 0221 245279 171 279;
    #P connect 160310;
460 #P fasten6l 0590193306186306;
    #P fasten 62 0 59 0 269 304 186 304;
    #P connect 59 0 58 1;
    #P connect 31 0300;
    #P connect 57 0 29 0;
465 #P connect 24 0 57 0;
    #P connect 160610;
    #P connect 2 1 311;
    #P connect 30 0 32 0;
    #P connect 550571;
470 #P connect 160180;
    #P connect 191 240;
    #Pconnect22 181;
    #P connect 24 1 20 0;
    #P connect 20 0 21 0;
475 #P connect 130330;
    #P connect 33 0 14 0;
    #P connect 161 620;
    #P connect 340331;
    #P fasten 170130134 104 312 104;
480 #P fasten 31 0340 178 109 407 109;
    #P connect 53 0 54 0;
    #P connect 18011 0;
    #P connect 540110;
    #P connect 11 0120;
485 #P connect 37 042 0;
    #P connect 42 0 38 0;
    #P connect 38 0 39 0;
    #P connect 39 0 40 0;
    #P connect40041 0;
490 #P connect 42 1 40 1;
    #P connect 35 0 36 0;
    #P connect 36 0 37 0;
    #P connect ll 0361;
    #P connect 41 0 53 0;
495 #P connect 460531;
    #P connect 51 0532;
    #P connect 37 1 47 0;
    #P connect 47 0 43 0;
    #P connect 43 0 44 0;
500 #P connect 44 045 0;
    #P connect 45 046 0;
    #P fasten 111 53 3 540 294 545 294;
    #P connect 471451;
    #P connect 37 2 52 0;
505 #P connect 52 0 48 0;
    #P connect 48 049 0;
    #P connect 49 0 50 0;
    #P connect 50 0 51 0;
```

APPENDIX B-continued

```
     #P connect 521501;
510  #P pop;
```

What is claimed is:

1. A system for producing a time-based representation of a recorded musical work, comprising:
   a sound recording of the recorded musical work;
   a musical meta-score algorithm that transforms non-audio musical source material into a musical meta-score that is synchronized with the sound recording based on a combination of harmonic, melodic, and rhythmic characteristics derived from the musical source material;
   a sonic meta-score algorithm that transforms the sound recording into a sonic meta-score comprising information related to sound characteristics of the recording that is synchronized with the sound recording;
   a synchronization algorithm that combines the musical meta-score and the sonic meta-score and maps data in the combination to visual descriptors; and
   a computer display system that displays a sequential series of images comprising renderings of the visual descriptors that are choreographed to the mapped combination of data.

2. The system according to claim 1, wherein the musical source material is selected from the group consisting of a musical score, a MIDI file or data stream, and a recording transcription.

3. The system according to claim 1, wherein the musical meta-score comprises digital encodings of pitches, rhythms, dynamics and arrangement of the sound recording.

4. The system according to claim 1, wherein the musical meta-score comprises time stamps accurate to the display of the sequential series of images.

5. The system according to claim 4, wherein the time stamps occur at a resolution utilized by known display timing or refresh standards.

6. The system according to claim 5, wherein the time stamps occur at a resolution of 30 frames/second.

7. The system according to claim 1, wherein the harmonic characteristics comprise data related to duration, key areas and chord vocabulary.

8. The system according to claim 1, wherein the melodic characteristics comprise data related to major themes, motifs and orchestration shifts.

9. The system according to claim 1, wherein the rhythmic characteristics comprise data related to meters, beat, measure division and patterns.

10. The system according to claim 1, wherein the sonic meta score comprises amplitude, pitch, and timbral envelope information.

11. The system according to claim 1, wherein the recording is a multi-part or multi-track recording comprising either digital or analog data.

12. The system according to claim 11, wherein each part of the multi-part recording represents either a single instrument or single voice.

13. The system according to claim 1, wherein the sound characteristics of the recording comprise pitch, timbre and volume.

14. The system according to claim 1, further comprising a configuration file comprising settings utilized to provide the sequential series of images.

15. The system according to claim 1, further comprising a user input with controls via which a user adjusts characteristics of the display of the sequential series of images.

16. The system according to claim 15, wherein the user input controls comprise controls for selectively isolating voices, freezing, zooming, panning around within the display, or adjusting a user viewpoint.

17. The system according to claim 1, further comprising an algorithm for mapping specific musical parts into a series of visual descriptors in a virtual scene on the computer display.

18. The system according to claim 17, wherein the visual descriptors are two- or three-dimensional visual descriptors or sprites.

19. The system according to claim 17, further comprising an algorithm for morphing the visual descriptors among a set of fixed geometric shapes according to pitch classes they represent.

20. The system according to claim 17, further comprising an algorithm for transforming the form of the visual descriptors based on at least one of pitch, volume, and salience.

21. The system according to claim 17, further comprising an algorithm for moving the visual descriptors based on information contained within the meta-scores.

22. The system according to claim 1, further comprising at least one of Fourier analysis algorithms and Linear Predictive Coding algorithms that are utilized in producing the sonic meta-score from the multi-part audio recording.

23. The system according to claim 1, wherein each visual descriptor corresponds to a single part of the multi-part recording.

24. The system according to claim 1, further comprising an algorithm for dividing the sound recording into thematic and structural elements, dividing the thematic and structural elements into sub-elements that are gestures or phrases, and dividing the sub-elements into individual notes, and for associating the thematic and structural elements, sub-elements, and individual notes into the sequential series of images.

25. The system according to claim 24, further comprising an algorithm for performing a hierarchical analysis in order to extrapolate the thematic and structural elements.

26. The system according to claim 1, further comprising an algorithm for providing lines or other trail markers to connect the visual descriptors and sequential series of images that represent melodic fragments, motifs and themes represented.

27. The system according to claim 1, further comprising an algorithm to apply data in the sonic meta-score to modify contour and shape of the visual descriptors.

28. The system according to claim 1, further comprising an event queue that comprises information combined from the musical meta-score and the sonic meta-score by image or frame.

29. The system according to claim 28, further comprising a mapping system that maps events in the event queue to visual descriptors.

30. The system according to claim 1, wherein the computer display system is a real-time display system.

31. The system according to claim 1, wherein the visual descriptors represent three-dimensional objects in three-dimensional space presented on the display system either in actual three-dimensional form or two-dimensional projected form.

32. The system according to claim 1, further comprising a storage area for storing the visual descriptors.

33. A method for producing a visual display that accurately represents a recorded musical work, comprising:
   transforming musical source material related to a multi-part sound recording into a musical meta-score that is synchronized with the sound recording based on a combination of harmonic, melodic, and rhythmic characteristics derived from the musical source material;

transforming the multi-part sound recording into a sonic meta-score comprising information related to sound characteristics of the recording that is synchronized with the sound recording;

combining the musical meta-score and the sonic meta-score and mapping data in the combination to visual descriptors; and displaying a sequential series of images comprising renderings of the visual descriptors as choreographed to the mapped combination of data.

34. The method according to claim 33, wherein the musical source material is selected from the group consisting of a musical score, a MIDI file or data stream, and a recording transcription.

35. The method according to claim 33, further comprising generating digital encodings of pitches, rhythms, dynamics and arrangement of the sound recording in the musical meta-score.

36. The method according to claim 33, further comprising generating time stamps accurate to the display of the sequential series of images in the musical meta-score.

37. The method according to claim 36, further comprising providing the time stamps at a resolution utilized by known display timing or refresh standards.

38. The method according to claim 37, wherein the resolution is 30 frames/second.

39. The method according to claim 33, wherein the harmonic characteristics comprise data related to duration, key areas and chord vocabulary.

40. The method according to claim 33, wherein the melodic characteristics comprise data related to major themes, motifs and orchestration shifts.

41. The method according to claim 33, wherein the rhythmic characteristics comprise data related to meters, beat, measure division and patterns.

42. The method according to claim 33, wherein the sonic meta-score comprises amplitude, pitch, and timbral envelope information.

43. The method according to claim 33, wherein the recording is a multi-part or multi-track recording comprising either digital or analog data.

44. The method according to claim 43, wherein each part of the multi-part recording represents either a single instrument or single voice.

45. The method according to claim 33, wherein the sound characteristics of the recording comprise pitch, timbre and volume.

46. The method according to claim 33, further comprising utilizing a configuration file to provide the sequential series of images.

47. The method according to claim 33, further comprising utilizing controls of a user input to adjust characteristics of the display of the sequential series of images.

48. The method according to claim 47, further comprising selectively isolating voices, freezing, zooming, panning around within the display, or adjusting a user viewpoint with the user input controls.

49. The method according to claim 33, wherein the displaying of a sequential series of images comprises displaying the sequential series of images on a computer display, and wherein the method further comprises mapping specific musical parts into a series of visual descriptors in a virtual scene on the computer display.

50. The method according to claim 49, wherein the visual descriptors are two- or three-dimensional visual descriptors or sprites.

51. The method according to claim 49, further comprising morphing the visual descriptors among a set of fixed geometric shapes according to pitch classes they represent.

52. The method according to claim 49, further comprising transforming the form of the visual descriptors based on at least one of pitch, volume, and salience.

53. The method according to claim 52, wherein the volume is a dynamic volume.

54. The method according to claim 49, further comprising moving the visual descriptors based on information contained within the meta-scores.

55. The method according to claim 33, further comprising utilizing at least one of Fourier analysis algorithms and Linear Predictive Coding algorithms in producing the sonic meta-score from the multi-part audio recording.

56. The method according to claim 33, wherein each visual descriptor corresponds to a single part of the multi-part recording.

57. The method according to claim 33, further comprising:
dividing the sound recording into thematic and structural elements;
dividing the thematic and structural elements into sub-elements that are gestures or phrases;
dividing the sub-elements into individual notes; and
associating the thematic and structural elements, sub-elements, and individual notes into the sequential series of images.

58. The method according to claim 57, further comprising performing a hierarchical analysis in order to extrapolate the thematic and structural elements.

59. The method according to claim 33, further comprising providing lines or other trail markers to connect the visual descriptors and sequential series of images that represent melodic fragments, motifs and themes represented.

60. The method according to claim 33, further comprising applying data in the sonic meta-score to modify contour and shape of the visual descriptors.

61. The method according to claim 33, further comprising producing an event queue that comprises information combined from the musical meta-score and the sonic meta-score by image or frame.

62. The method according to claim 61, further comprising mapping events in the event queue to visual descriptors.

63. The method according to claim 33, wherein the displaying of a sequential series of images comprises displaying the sequential series of images on a computer display system, and wherein the computer display system is a real-time display system.

64. The method according to claim 33, wherein the visual descriptors represent three-dimensional objects in three-dimensional space presented on the display system either in actual three-dimensional form or two-dimensional projected form.

65. The method according to claim 33, further comprising storing the visual descriptors in a storage area.

* * * * *